United States Patent [19]

Conn

[11] Patent Number: 5,226,974
[45] Date of Patent: Jul. 13, 1993

[54] HIGH QUALITY BRAZING PASTE FOR AN ALUMINUM MATERIAL

[75] Inventor: Paul J. Conn, Grand Island, N.Y.

[73] Assignee: The S. A. Day Mfg. Co., Inc., Buffalo, N.Y.

[21] Appl. No.: 911,569

[22] Filed: Jul. 9, 1992

[51] Int. Cl.⁵ .............................. B23K 35/34
[52] U.S. Cl. .......................... 148/23; 148/26
[58] Field of Search ........................ 148/23, 26

[56] References Cited

U.S. PATENT DOCUMENTS

| | | | |
|---|---|---|---|
| 3,580,748 | 5/1971 | Delong | 148/26 |
| 3,769,099 | 10/1973 | DeLong | 148/26 |
| 3,951,328 | 4/1976 | Wallace et al. | 228/207 |
| 4,273,593 | 6/1981 | Mastrangelo | 148/24 |
| 4,475,960 | 10/1984 | Yamawaki et al. | 148/26 |
| 4,579,605 | 4/1986 | Kawase et al. | 148/26 |
| 4,619,716 | 10/1986 | Suzuki et al. | 148/26 |
| 4,670,067 | 6/1987 | Suzuki | 148/26 |
| 4,689,092 | 8/1987 | Suzuki et al. | 148/26 |
| 4,723,597 | 2/1988 | Sonoda | 148/26 |
| 4,901,909 | 2/1990 | George | 228/223 |
| 4,923,530 | 5/1990 | Miki et al. | 148/26 |
| 4,941,929 | 7/1990 | Tecle | 148/24 |
| 5,100,048 | 3/1992 | Timsit | 229/198 |

Primary Examiner—Peter D. Rosenberg
Attorney, Agent, or Firm—Hodgson Russ Andrews Woods & Goodyear

[57] ABSTRACT

A brazing paste for aluminum or aluminum alloy parts. The paste consists essentially of, by weight, between about 8 and 72 percent potassium tetrafluoroaluminate having a purity of at least about 96 percent, between about 15 and 75 percent aluminum-silicon alloy, and between about 2.5 and 50 percent organic carrier having a vaporization temperature which is below the melting temperature of the aluminum-silicon alloy, and the melting temperature of the potassium tetrafluoroaluminate being below the melting temperature of the aluminum-silicon alloy. The high purity potassium tetrafluoroaluminate has a lower melting temperature so that a greater number of aluminum-silicon alloys may be used therewith and does not have corrosive substances so that the braze can be of high quality and not require additional steps of washing and drying the brazed part for overall cost savings.

2 Claims, No Drawings

HIGH QUALITY BRAZING PASTE FOR AN ALUMINUM MATERIAL

The present invention relates generally to the art of brazing. More particularly, the present invention relates to a paste for brazing aluminum or aluminum alloy parts.

Aluminum material is being used more frequently in heat exchangers, such as radiators for automobiles, due to the necessity of reducing the weight. In order to process the aluminum material into radiators or other products, it is necessary to join aluminum parts. It is also desirable to repair minor flaws to aluminum parts during the production process. Brazing offers a suitable joining and repairing method.

In the brazing of an aluminum material, a brazing alloy is used which has a melting point that is somewhat lower than that of the aluminum material being brazed. A typical brazing alloy is a eutectic alloy of aluminum and silicon. As the term is used herein and in the claims, the term "aluminum" is meant to include alloys thereof.

In order to suitably join the brazing alloy with the aluminum material, it is necessary to remove oxide films present on the surface of the aluminum material. In order to remove such films, a flux is applied along with the brazing alloy.

Art of interest as showing various materials and processes for the brazing of aluminum material are U.S. Pat. No. 3,951,328 to Wallace et al; U.S. Pat. No. 4,273,593 to Mastrangelo; U.S. Pat. No. 4,475,960 to Yamawaki et al; U.S. Pat. No. 4,579,605 to Kawase et al; U.S. Pat. No. 4,619,716 to Suzuki et al; U.S. Pat. No. 4,689,092 to Suzuki et al; U.S. Pat. No. 4,723,597 to Sonda; 4,901,909 to George; U.S. Pat. No. 4,923,530 to Miki et al; U.S. Pat. No. 4,941,929 to Tecle: and U.S. Pat. No. 5,100,048 to Timsit.

Mastrangelo discloses a metal joining paste comprising a metal alloy powder, such as aluminum-silicon alloy powder, and a vehicle therefor, such as hydroxypropyl cellulose blended with glycerine and further blended with a mixture of polyalkoxyalkanols (including dialkylene glycols). Mastrangelo further dicloses that the paste may optionally comprise a specialized flux, such as Nocolok flux, which represents a group of potassium fluoroaluminate complex fluxes developed by Alcan Aluminum Corporation. This flux has been found to have a melting temperature of about 585 degrees C. By "melting temperature" of a flux, as the term is used in this application, is meant the temperature at which it is fully melted, sufficient for use as a flux, although some melting may begin at a lower temperature.

Timsit discloses a method of brazing aluminum wherein a coating is applied to at least one of the aluminum surfaces to be joined. The coating comprises a mixture of a metal, preferably silicon, and a brazing flux. The brazing flux is described as preferably Nocolok flux. The coating is applied as a dry powder or as a slurry, preferably in a volatile carrier such as an alcohol.

Wallace et al discloses a method of joining metal surfaces by means of a flux comprising a mixture of potassium fluoroaluminates. The flux may be mixed with an aluminum alloy of a type used as a brazing alloy and with a resinous vehicle.

George is directed to a polybutene containing paste comprising a flux material and an alloy filler such as aluminum-silicon eutectic alloy powder. The flux comprises aluminum fluoride, potassium fluoride, and cesium chloride.

Tecle discloses a solder paste formulation comprising stannous fluoride, a metal alloy such as a silicon alloy, and a carrier such as ethylene glycol, glycerol, and mixtures thereof.

The remaining ones of the above patents disclose the use of alkali (e.g., potassium) fluoroaluminates as fluxing materials and methods of making the same. These fluxes are used in brazing aluminum surfaces and may be utilized in combination with an aluminum-silicon alloy.

The materials disclosed in the above patents have various disadvantages including ingredients which result in corrosive residues requiring washing and drying of brazed parts and melting temperatures, such as 585 degrees C for the flux of Mastrangelo and Timsit, which would foreclose the use of certain aluminum-silicon alloys having lower temperatures in a paste. The ingredients may also be formulated for delivery in a way which is difficult and/or expensive.

As described in the Suzuki et al '716 patent, potassium tetrafluoroaluminate ($KAlF_4$), which is desirably inactive to aluminum, has been used as a flux for brazing aluminum material. $KAlF_4$ is a complex salt which has been produced by mixing and melting equimolar amounts of potassium fluoride (KF) and aluminum fluoride ($AlF_3$) and pulverizing the product.

The Suzuki et al '716 patent states that the use of $KAlF_4$ as a flux has a drawback in that the method of supplying the flux to the brazing part is complicated. The method described therein is a conversion-coating process wherein the brazing powder, and a powdered brazing alloy if needed, is suspended in water, and the assembly to be brazed immersed therein and removed therefrom and dried thereby depositing the flux, or the flux and the brazing alloy, on the brazing part. Thereafter, the assembly is heated to a predetermined temperature to melt the flux and the brazing alloy whereby the brazing alloy penetrates through the brazing part and, when cooled, the brazing part is joined by the brazing alloy.

In order to provide a less complicated brazing process, the Suzuki et al '716 patent suggests that the aluminum material to be brazed be brought into contact with a treating solution containing potassium and fluorine ions to cause a chemical reaction between aluminum components and potassium and fluorine ions, thereby forming $K_2AlF_5$, which is present on the surface of the aluminum material as a uniform coating and acts as the flux during brazing. $K_2AlF_5$ undesirably breaks down and forms corrosive products on the surface of the aluminum material which affect the brazing quality and require a washing step of the aluminum material after brazing thereof.

The Suzuki et al '716 patent further discloses that aluminum products obtained while brazing with $KAlF_4$ are subject to pitting corrosion due to chlorine resulting from deicing salt, sea salt, or the like resulting in a tendency to form penetrated holes. In order to prevent this, Suzuki et al '716 states that it is required to form a zinc or zinc alloy layer for forming a pitting corrosion inhibiting layer on the surface of the aluminum material to be used, beforehand in a separate step. This is believed to be because the $KAlF_4$ described in Suzuki et al '716 must undesirably be a corrosive product in that it must have corrosive impurities in it.

The conversion-coating process as described in Suzuki et al '716 is not suitable for bonding fittings, connections, miscellaneous support angles, and the like as well as not being suitable for repairing flaws in parts so that they need not be scrapped. Heretofore, if there were flaws in aluminum parts, they were normally scrapped.

Brazing of fittings and the like has been by the use of a chloride paste using lithium and cesium. Another paste which has been used for bonding aluminum comprises a combination of zinc chloride, ammonium chloride, and alcohol. However, chloride is disadvantageously corrosive, and cesium may present health problems. A suitable material for bonding aluminum fittings, connections, miscellaneous support angles, and for repairing flawed aluminum parts without such corrosive effects is thus desired.

In order to be effective, the melting temperature of the flux must be below the melting temperature of the aluminum-silicon alloy. Many $KAlF_4$ fluxes have been provided which melt at a temperature of around 585 degrees C. For example, Nocolok flux containing potassium tetrafluoroaluminate has been found to have a melting point of about 585 degrees C. Since the melting temperature of the aluminum-silicon alloy must be greater than the melting temperature of the flux, this requires that the melting temperature of the aluminum-silicon alloy must be greater than 585 degrees C for it to be used with such a flux. However, it may be desired to use aluminum-silicon alloys having melting temperatures in the range of about 575 to 585 degrees C. For example, 4047 alloy melts in the range of about 577 to 582 degrees C. Thus, the number of alloys with which a flux having a melting temperature of 585 degrees C can be used is limited.

It is therefore an object of the present invention to provide a brazing paste for aluminum parts which provides a high quality bond and which is non-corrosive whereby the step of washing the parts after bonding may be eliminated for cost savings.

It is another object of the present invention to provide such a paste which can incorporate aluminum-silicon alloys which have melting points as low as about 575 degrees C.

In accordance with the present invention a brazing paste for aluminum or aluminum alloy parts is provided which consists essentially of, by weight, between about 8 and 72 percent potassium tetrafluoroaluminate having a purity of at least about 96 percent, between about 15 and 75 percent aluminum-silicon alloy, and between about 2.5 and 50 percent organic carrier having a vaporization temperature which is below the melting temperature of the aluminum-silicon alloy, and the melting temperature of the potassium tetrafluoroaluminate being below the melting temperature of the aluminum-silicon alloy.

The above and other objects, features, and advantages of the present invention will be apparent in the following detailed description of the preferred embodiments thereof.

DETAILED DESCRIPTION OF THE PREFERRED EMBODIMENTS

In accordance with the present invention there is provided a paste for brazing aluminum or aluminum alloy parts such as fittings, connections, miscellaneous support angles, and for repair of flaws in various aluminum or aluminum alloy parts. The paste consists essentially of, by weight, between about 8 and 72 percent potassium tetrafluoroaluminate, between about 15 and 75 percent aluminum-silicon alloy, and between about 2.5 and 50 percent organic carrier.

An organic carrier, unlike water, does not volatize too quickly and does not leave a residue which might be corrosive and which would undesirably require washing of the brazed part or parts. Water may tend to evaporate before the paste is applied to a brazing site. The organic carrier should have a vaporization temperature which is below the melting temperature of the aluminum-silicon alloy so that the organic carrier will vaporize at the brazing site leaving just the metal. Thus, the organic carrier does not leave any residues which may interfere with the brazing quality. A suitable organic carrier comprises a combination of glycerine and ethylene or polyethylene glycol or propylene glycol. Glycerine is suitably included to make the paste viscous and to suspend the alloy well. An example of another suitable organic carrier is a combination of hydroxymethyl cellulose and glycerine. The organic carrier is driven off as the paste is heated in, for example, an oven for melting the flux and the aluminum-silicon alloy, or an open torch (flame brazing) process.

The aluminum-silicon alloy is a filler, and can be varied to adjust the melt point to accommodate differences in furnaces used and in the composition of the part or parts being bonded or repaired. However, the aluminum-silicon alloy must have a melting temperature which is above the melting temperature of the potassium tetrafluoroaluminate in order that the potassium tetrafluoroaluminate flux may fracture any oxide coatings on the part or parts being repaired before the aluminum-silicon alloy is melted so as to enable effective bonding to occur. Thus, the melting temperature of the potassium tetrafluoroaluminate must be below the melting temperature of the aluminum-silicon alloy.

Many conventional potassium tetrafluoroaluminate fluxes have a melting temperature of about 585 degrees C or higher, which is about 10 degrees C higher than pure potassium tetrafluoroaluminate due to various impurities therein; aluminum-silicon alloys having melting temperatures in the range of 575 to 585 degrees C cannot suitably be used therewith. In accordance with the present invention the potassium tetrafluoroaluminate is provided to have a purity of at least about 96 percent, which provides a melting temperature of about 575 degrees C (with a stability to about 700 degrees C) so that this high purity flux may be used in a paste with various aluminum-silicon alloys having melting temperatures in the 575 to 585 degree C range as well as temperatures above 585 degrees C. Such a high purity flux does not contain corrosive impurities of any significance. Since this flux material absorbs only minimal water (0.4 percent water), it does not absorb enough water to generate corrosive substances, such as hydrogen fluoride or potassium fluoride, during the brazing process. As a result, any flux residues which remain on the surface of a brazed part after brazing with the flux are generally non-corrosive.

Since the paste of the present invention does not result in any significant corrosive contamination of the brazing site, a high quality braze may be provided with the step of washing and drying the parts after brazing being desirably eliminated for cost savings. By eliminating the step of washing the brazed parts, it is also not necessary to treat any wastewater from such washing thereby resulting in additional cost savings.

Although the paste only essentially requires the potassium tetrafluoroaluminate, the aluminum-silicon alloy, and the organic carrier, small amounts of other substances may, if desired, be added. For example, it may be desired to add about one to three percent zinc to provide additional corrosion protection of the brazed part. For another example, it may also be desired to add up to 1 percent of $K_2AlF_3$ to help in breaking up the oxide and to improve the bond.

An example of a suitable potassium tetrafluoroaluminate flux having a purity of at least about 96 percent is marketed by Flux Schweib Und Lotstroffe GmbH of Garbsen, Germany. The melting temperature of this flux has been measured at 574.47 degrees C. Such a flux is distinguished from typical fluxes having purities of 85 percent or less.

Since even high purity $KAlF_4$ has a melting temperature only as low as about 575 degrees C, the 570 degrees C melting temperature discussed in Suzuki et al '716 at col. 1, lines 46 and 47, is believed to have been meant to refer to the temperature at which the $KAlF_4$ flux thereof first begins to melt, and that the temperature at which its flux is fully melted is probably about 585 degrees C or higher.

A high purity flux as marketed by the aforesaid German company may be made as follows, the percentages being by weight. Hydrofluoric acid (HF), preferably about 70 percent concentration, is added to high purity aluminum metal powder to thereby form aluminum fluoride in solution. Nitric acid is then added to this solution whereby impurities, including copper and zinc, in the solution dissolve into the nitric acid and are thereafter removed by water washing. Thus, water is then added to the solution to precipitate therefrom solid aluminum fluoride with the nitric acid and dissolved impurities washed free therefrom. This aluminum fluoride after drying is then milled, such as by ball-milling with ceramic balls or by any other method suitable for breaking up the aluminum fluoride into smaller particles, in the presence of hydrofluoric acid, preferably about 70 percent concentration, and potassium hydroxide (KOH), preferably about 50 percent concentration. As the particles of aluminum fluoride are crushed into smaller particles, they are exposed to hydrofluoric acid and potassium hydroxide, with fluorine from the hydrofluoric acid and potassium from the potassium hydroxide chemically combining therewith, to form the high quality $KAlF_4$. By "high purity potassium tetrafluoroaluminate", as the term is used herein, is meant a potassium tetrafluoroaluminate which has a purity in the range of about 96 percent or more. Such a high purity is desired to achieve a low melting temperature of about 575 degrees C and to be devoid of any appreciable corrosive substances which might leave a corrosive film on an aluminum part being brazed therewith. Such a flux purity is distinguished from the purity of the aforesaid Nocolok flux which has been determined to be about 85 percent.

By "high purity aluminum metal powder", as the term is used herein, is meant an aluminum metal powder having a purity of at least about 99.7 percent or of otherwise sufficient purity to produce high purity $KAlF_4$ by the process described herein.

The hydrofluoric acid is added to the aluminum metal powder in an amount equal to the proper molar proportion plus an excess of perhaps about 10 to 15 percent, all of the percentages named herein being by weight.

The nitric acid is suitably added in an amount equal to between about 3 and 10 percent, preferably about 5 percent, of the hydrofluoric acid.

After washing with the nitric acid, the solution is cooled to room temperature and then washed, preferably three or more times, with water for removing the impurities. The first washing causes the aluminum fluoride to precipitate out, and subsequent washings are desirable to remove any residual impurities including excess hydrofluoric acid from the aluminum fluoride.

The aluminum fluoride particles are milled for a period of several hours to obtain a homogenous mixture and reaction with a particle size preferably between about 7 and 100 micrometers (a range of about 1000 to 150 grit). The product is then washed, preferably three or more times, in water for further purification and dried at a temperature of preferably between about 250 and 300 degrees C.

The process according to the present invention utilizes no mixture of potassium fluoroaluminate complexes such as $K_3AlF_6$, $K_2AlF_5$, $K_2AlF_5+H_2O$, $AlF_3$, and the like which either hydrolyze to corrosive chemical components such as potassium fluoride or increase the melting temperature beyond 575 degrees C.

The following is a preferred formulation for the paste, the percentages being by weight:
35.6 percent aluminum-silicon alloy
40.2 percent $KAlF_4$ having a purity of at least about 96 percent
18.8 percent ethylene or polyethylene or propylene glycol
5.4 percent glycerine An example of a suitable paste has the following formulation:
45 grams $KAlF_4$ having a purity of at least about 96 percent
36 grams of 4047 aluminum-silicon alloy
35 grams polyethylene glycol
7 grams glycerine Another example of a suitable paste is as follows:
47 grams $KAlF_4$ having a purity of at least about 96 percent
35 grams of 4047 aluminum-silicon alloy
31 grams propylene glycol
7 grams glycerine After the paste is applied to the part or parts and after an initial drying step in a drying oven, they progressively enter a brazing furnace with a preferably nitrogen atmosphere having a dew point of about −40 degrees C and having less than 100 ppm oxygen, more preferably less than 40 ppm oxygen, and heated by radiation or convection or both sufficient to melt the aluminum-silicon alloy for brazing thereof to thereby result in a high quality braze with no corrosive flux residues remaining on the surface so that it is unnecessary to wash and dry the brazed parts.

A paste according to the present invention has a lower melting point flux thereby allowing a greater range of aluminum-silicon alloys to be used. Tests have shown this paste to provide a higher quality braze without corrosive residues. This allows washing and drying of brazed parts and treatment of the wastewater to be desirably eliminated for cost savings. The paste may also be used freely with a wide variety of heating apparatus including the open torch type.

It should be understood that while the present invention has been described in detail herein, the invention can be embodied otherwise without departing from the principles thereof. Such other embodiments are meant to come within the scope of the present invention as defined by the appended claims.

What is claimed is:

1. A brazing paste for aluminum or aluminum alloy parts consisting essentially of, by weight, between about 8 and 72 percent potassium tetrafluoroaluminate having a purity of at least about 96 percent, between 15 and 75 percent aluminum-silicon alloy, and between about 2.5 and 50 percent organic carrier having a vaporization temperature which is below the melting temperature of said aluminum-silicon alloy, the melting temperature of said potassium tetrafluoroaluminate being below the melting temperature of said aluminum-silicon alloy.

2. A brazing paste for aluminum or aluminum alloy parts consisting essentially of, by weight, between about 8 and 72 percent potassium tetrafluoroaluminate having a purity of at least about 96 percent, between about 15 and 75 percent aluminum-silicon alloy, and between about 2.5 and 50 percent organic carrier having a vaporization temperature which is below the melting temperature of said aluminum-silicon alloy, the melting temperature of said potassium tetrafluoroaluminate being below the melting temperature of said aluminum-silicon alloy, the melting temperature of said potassium tetrafluoroaluminate being about 575 degrees C., and wherein said organic carrier comprises glycerine and a material selected from the group consisting of ethylene glycol, polyethylene glycol, and propylene glycol.

* * * * *